(12) United States Patent
Frost et al.

(10) Patent No.: US 7,331,612 B2
(45) Date of Patent: Feb. 19, 2008

(54) LOW PROFILE TENSION STYLE FLEXIBLE JOINT

(75) Inventors: Cristopher Frost, Scottsdale, AZ (US); Richard D. Kocher, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 473 days.

(21) Appl. No.: 10/810,456

(22) Filed: Mar. 26, 2004

(65) Prior Publication Data

US 2005/0212283 A1    Sep. 29, 2005

(51) Int. Cl.
F16L 55/00 (2006.01)
(52) U.S. Cl. .................. 285/92; 285/331; 285/403; 285/917; 277/644; 277/647
(58) Field of Classification Search ............ 285/81, 285/89, 92, 95, 98, 278, 279–281, 378, 331, 285/917, 403; 277/644, 647
See application file for complete search history.

(56) References Cited

U.S. PATENT DOCUMENTS

| | | | | |
|---|---|---|---|---|
| 1,586,725 A | * | 6/1926 | Westinghouse et al. | 285/279 |
| 2,407,745 A | * | 9/1946 | Jacobson | 285/278 |
| 3,279,806 A | * | 10/1966 | Bialkowski | 277/647 |
| 3,692,337 A | * | 9/1972 | Mischel | 285/226 |
| 3,770,303 A | | 11/1973 | Hallett | |
| 3,799,586 A | | 3/1974 | Caras et al. | |
| 4,165,107 A | | 8/1979 | Affa et al. | |
| 4,427,220 A | | 1/1984 | Decker | |
| 4,524,996 A | * | 6/1985 | Hunt | 285/55 |
| 4,643,463 A | | 2/1987 | Halling et al. | |
| 5,090,746 A | | 2/1992 | Holzhausen | |
| 5,697,651 A | | 12/1997 | Fernandes | |
| 6,499,770 B1 | | 12/2002 | Glista et al. | |
| 2003/0132630 A1 | | 7/2003 | French | |

* cited by examiner

*Primary Examiner*—Aaron Dunwoody
(74) *Attorney, Agent, or Firm*—Ingrassia Fisher & Lorenz

(57) ABSTRACT

A low profile tension style flexible joint for pneumatic ducting may be useful as, for example, a joint for aircraft engine pneumatic ducting. The joint of the present invention may be used at both ends of a duct that passes high temperature (up to about 1200° F.) and high pressure (up to about 110 psia) compressor air to the combustor of a turbomachine. Some turbomachines, such as the turbo engine of a jet-powered aircraft, require a very short curved duct to fit into an unusually small aircraft installation envelope. Moreover, these installations also require those features found in conventional flex joints, including being able to support the axial load inherent in pressurized ducting systems. Unlike conventional flexible joints, such as ball joints, gimble joints and pressure compensated joints, the low profile tension style flexible joint of the present invention provides a low profile, low weight design with the ability to support the axial load inherent in pressurized ducting systems.

24 Claims, 6 Drawing Sheets

LOW PROFILE TENSION STYLE FLEXIBLE JOINT

This invention was made with Government support under contract number N00019-02-C-3002, awarded by the U.S. Navy. The Government has certain rights in this invention.

BACKGROUND OF THE INVENTION

The present invention generally relates to a joint for pneumatic ducting and, more specifically, to a low profile tension style flexible joint for pneumatic ducting for apparatus such as gas turbine engines.

Gas turbine ("jet") engines may be used to provide the thrust needed to propel aircraft. Additionally, by redirecting a portion of the compressed air produced by the engines through a conduit system, the air can be used for a variety of other purposes. These other purposes include pressurizing, heating, and cooling the aircraft's cabin, deicing its wings and engine cowlings, and removing moisture from its front windows.

Due to variations in pressure, temperature, wind, and other factors which influence an aircraft in flight and the stresses caused during takeoffs and landings, the conduit system can experience frequent and sudden changes in its position. To minimize any adverse effect of these changes on the integrity of the conduit system, flexible joints connecting rigid duct sections have been proposed and utilized. To be of use, the duct joints must not only permit rotational and angular movement between the rigid ducts, but they must do so with minimum leakage of the compressed air passing through the system. Consequently, such joints must not only permit rotational and angular movement, but they must also include a low leakage seal to minimize escape of the air.

Tension style flexible joints are a special type of flexible joint which internally support the axial load inherent in pressurized ducting systems, a characteristic which becomes particularly important in high pressure applications that generate large axial loads. The use of tension style flexible joints for high pressure applications eliminates the need for external supports and reduces the chances of fatigue failures in the pneumatic ducting systems.

In many of today's modern turbomachines, such as turbo-powered aircraft, both overall engine weight and size are issues of concern for engineers. Reduced engine size and lower weight goals have required smaller installation envelopes for the jet engine, including the pneumatic ducting used thereupon.

Accordingly, there is a need for an improved duct joint that permits rotational and angular movement between duct sections, minimizes the escape of compressed air through the conduit system, and allows for installation in an installation envelope of minimal size.

SUMMARY OF THE INVENTION

In one aspect of the present invention, a joint for connecting a duct to a port comprises an annular flange, having a sealing flange disposed radially outward therefrom, the flange fixedly attached to the duct; a female mating flange, having female threads disposed internally thereon, the female mating flange fixedly attached to the port; and an annular seat collar having male threads disposed externally thereon; wherein the male threads are threadably attachable to the female threads; and the annular seat collar having a surface contacting the sealing flange when the joint is assembled.

In another aspect of the present invention, a low profile tension style flexible joint comprises an annular flange, having a sealing flange disposed radially outward therefrom, the collar fixedly attached to the duct; a female mating flange, having female threads disposed internally thereon, the female mating flange fixedly attached to the port; an annular seat collar having male threads disposed externally thereon; a bellows seal sealingly positioned between the sealing flange and the female mating flange; and a locking ring disposed over at least a portion of a circumference of the female mating flange; wherein the male threads threadably attach the female threads; and the annular seat collar having a spherical portion contacting the sealing flange when the joint is assembled.

In yet another aspect of the present invention, a low profile tension style flexible joint for use in ducting compressor air to a turbomachine combustor, comprises an annular flange, having a sealing flange disposed radially outward therefrom, the collar fixedly attached to the duct; a female mating flange, having female threads disposed internally thereon, the female mating flange fixedly attached to the port; a annular seat collar having male threads disposed externally thereon; a bellows seal sealingly positioned between the sealing flange and the female mating flange; a protuberance on a distal end, relative to the port, of the female mating flange; a groove in an outer circumferential surface of the annular seat collar, wherein the protuberance fits into the groove when the joint is assembled, thereby preventing axial separation of the joint; and a locking ring disposed in a channel over at least a portion of a circumference of the female mating flange; wherein the male threads threadably attach to the female threads; the annular seat collar having a spherical portion contacting the sealing flange when the joint is assembled; and the joint has a length of less than about 1.5 inches and a diameter of about 1.0 inch greater than the diameter of the duct.

In a further aspect of the present invention, a method for joining duct and a port comprises attaching an annular flange to the duct, the annular flange having a sealing flange disposed radially outward therefrom; providing a female mating flange attached to the port, the female mating flange having threads disposed internally thereon; threadably engaging the female threads of the female mating flange with male threads of an annular seat collar having male threads disposed externally thereon; and threading the male threads with the female threads to a point to cause contact between a portion of the sealing flange and the annular seat collar.

In another aspect of the present invention, a pneumatic duct having at least one joint on at least one end thereof for attaching the duct to a port, the joint comprises an annular flange, having a spherical sealing flange disposed radially outward therefrom, the collar attached to the duct; a female mating flange, having female threads disposed radially inward therefrom, the female mating flange attached to the port; a annular seat collar having male threads disposed radially outward therefrom; a bellows seal positioned between the spherical sealing flange and the female mating flange; and a locking ring disposed in a channel over at least a portion of a circumference of the female mating flange; wherein the male threads threadably attach to the female threads; and the annular seat collar having a spherical portion contacting the spherical sealing flange when the joint is assembled.

In still a further aspect of the present invention, a turbomachine having a duct for ducting compressor air to a combustor, comprises a low profile tension style flexible joint for connecting the duct to a port on the turbomachine, the low profile tension style flexible joint comprises an annular flange, having a sealing flange disposed radially outward therefrom, the collar attached to the duct; a female mating flange, having female threads disposed radially inward therefrom, the female mating flange attached to the port; a annular seat collar having male threads disposed radially outward therefrom; a bellows seal positioned between the sealing flange and the female mating flange; and a locking ring disposed in a channel over at least a portion of a circumference of the female mating flange; wherein the male threads threadably attach to the female threads; and the annular seat collar having a spherical portion contacting the sealing flange when the joint is assembled.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Briefly, the present invention provides a low profile tension style flexible joint for pneumatic ducting useful as, for example, a joint for aircraft engine pneumatic ducting. The joint of the present invention may be used at either end, and typically, at both ends of a duct that passes high temperature (up to about 1200° F.) and high pressure (up to about 110 psia) compressor air to the combustor of a turbomachine. Some turbomachines, such as the turbo engine of a jet-powered aircraft, may require a very short curved duct to fit into an unusually small installation envelope. Moreover, these installations also require those features found in conventional flex joints, including being able to support the axial load inherent in pressurized ducting systems.

Unlike conventional styles of flexible joints, such as ball joints, gimble joints and pressure compensated joints, the low profile tension style flexible joint of the present invention provides a low profile design with the ability to support the axial load inherent in pressurized ducting systems. Conventional flexible joints lack the ability to provide adequate load support while being able to fit into the required engine envelope. The flexible joints of the present invention provide a low profile design, permitting installation in a variety of applications, even where the installation envelope is too small for conventional flexible joint installation.

Regular maintenance of the turbomachine may require removal of the pneumatic duct for access. Maintenance specifications may require that no special tools should be needed for duct removal nor should adjustments need to be made when the duct is removed and reinstalled. The low profile tension style flexible joint of the present invention provides not only a low profile design that supports axial load, but also allows for simple removal and reinstallation.

Figure 1:
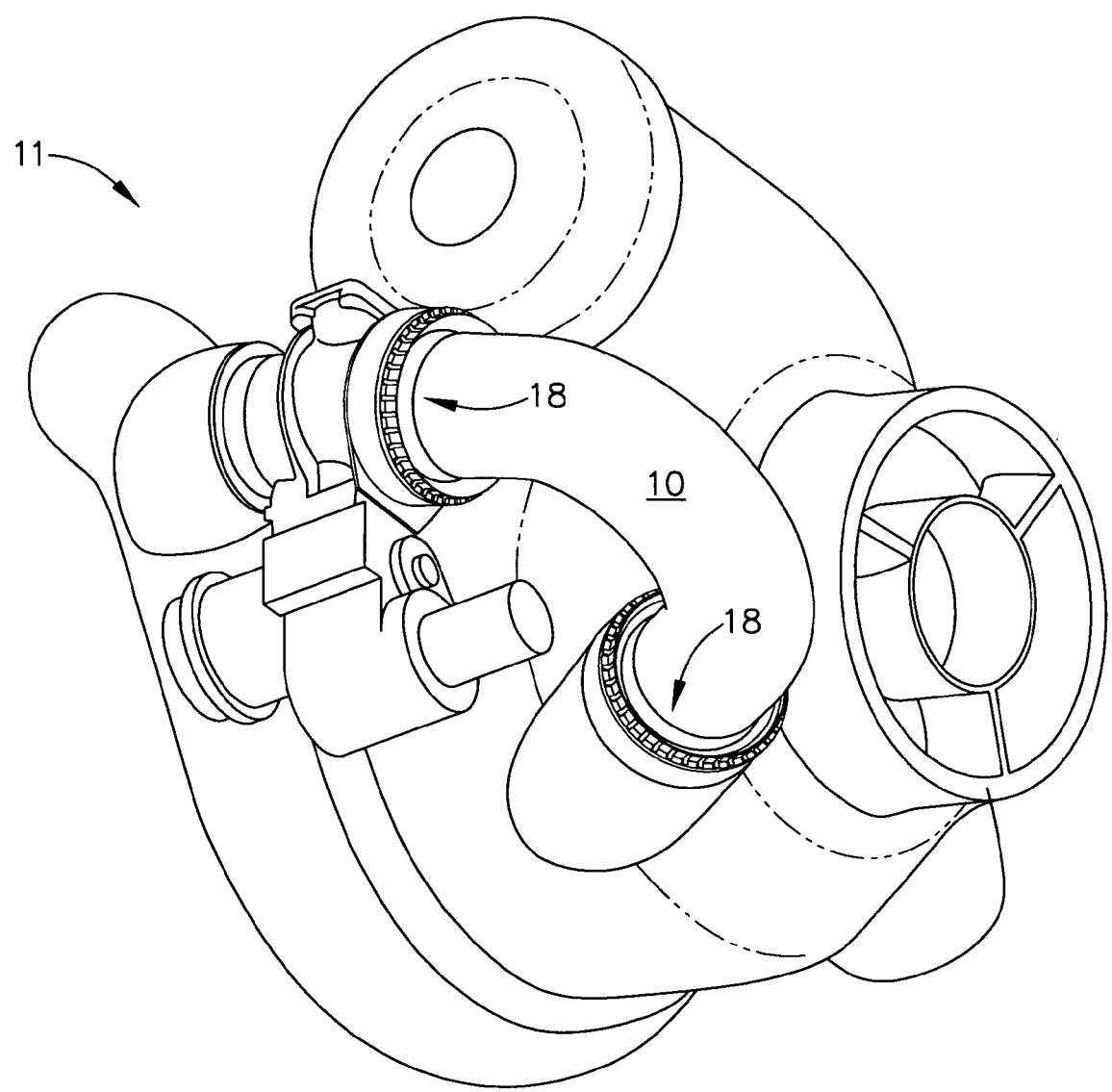
FIG. 1 is a perspective view of a turbomachine configured with a low profile tension style flexible joint according to the present invention.

Referring to FIG. 1, there is shown a perspective view of a turbomachine 11 with a pneumatic duct 10 having a low profile tension style flexible joint 18 (hereinafter also referred to as "joint 18") according to the present invention.

Figure 2:
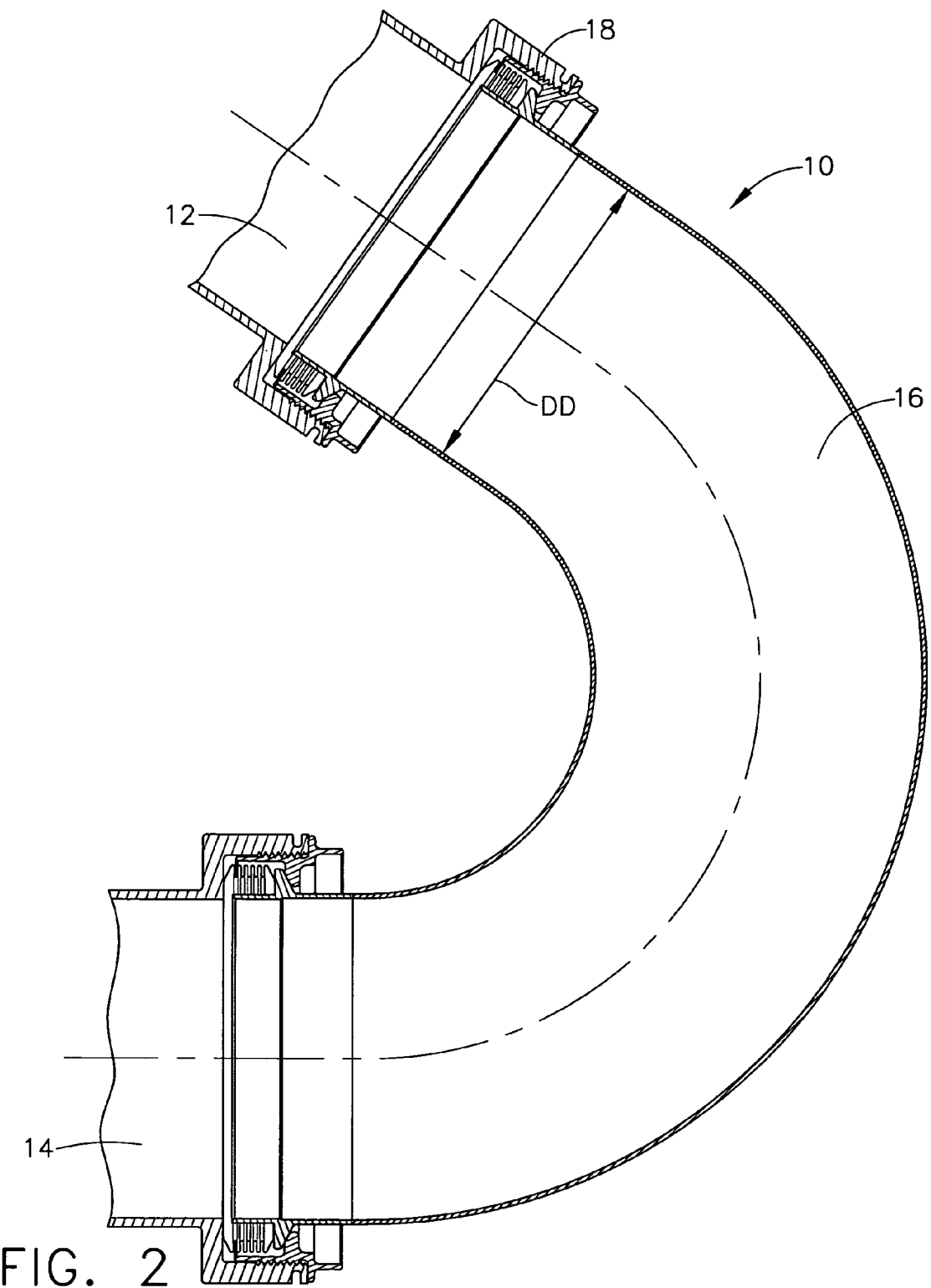
FIG. 2 is a cross-sectional view of pneumatic ducting having a low profile tension style flexible joint according to an embodiment of the present invention.

Referring to FIG. 2, there is shown a cross-sectional view of a pneumatic duct 10 having a low profile tension style flexible joint 18 at both a first end 12 and a second end 14 of duct 10 according to an embodiment of the present invention. First end 12 and second end 14 of duct 10 may be connected via a bend 16. Duct 10 may be made of any material suitable for withstanding the operating temperatures (up to about 1200° F.) and pressures (up to about 110 psia) normally found for pneumatic ducting in turbomachines. Such materials may include steel, nickel superalloys, such as the nickel-chromium-molybdenum alloy Inconel 625, and titanium.

Figure 3:
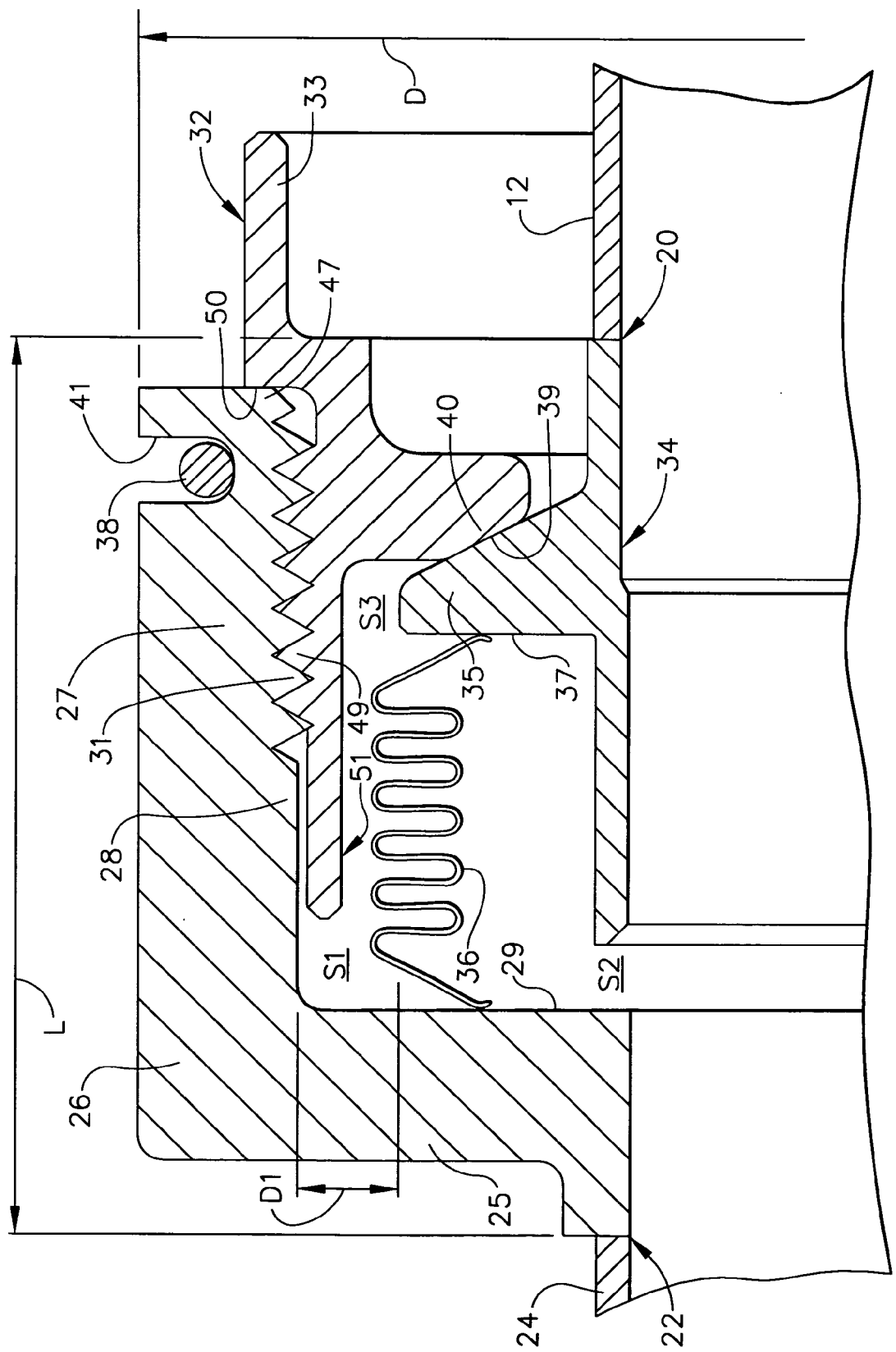
FIG. 3 is a cross-sectional view of the low profile tension style flexible joint of FIG. 1.

Referring now to FIG. 3, there is shown a close up cross-sectional view of the low profile tension style flexible joint 18 of FIG. 1. An annular flange 34 may be fixedly attached, for example, by welding, typically with a weld, to first end 12 of duct 10 (not shown) at attachment location 20. Annular flange 34 may include an annular sealing flange 35, radially disposed about annular flange 34, having a sealing surface 37 positioned at an angle, typically orthogonal to the direction of duct 10 at first end 12, and a spherical surface 39 positioned opposite sealing surface 37.

Low profile tension style flexible joint 18 may also include a female mating flange 26 that may be attached to, by welding, for example, or, alternatively, formed integrally with pneumatic port 24 of a turbomachine (not shown) at an attachment location 22. Female mating flange 26 may include a first section 25 and a second section 27. First section 25 may be attached to attachment location 22 and to second section 27 at opposite ends thereof. First section 25 may include a sealing surface 29 positioned at an angle, typically orthogonal to the direction of duct 10 at pneumatic port 24. Sealing surface 29 may be may be sized a distance D1 larger than sealing surface 37. Second section 27 may form an annular band circumscribing at least a portion of annular flange 34. An interior portion 28 of second section 27 may include threads 31.

Low profile tension style flexible joint 18 may also include an annular seat collar 32 having a spherical portion 40, a threaded portion 49 and a radial piloting surface 51. When installed into joint 18, threaded portion 49 may threadably mate with threads 31 of female mating flange 26 and spherical portion 40 may abut spherical surface 39 of annular sealing flange 35. A grip 33 may be formed on annular seat collar 32 to assist in threading threaded portion 49 onto threads 31 of female mating flange 26.

A bellows seal 36 may be installed between sealing surface 37 of annular sealing flange 35 and sealing surface 29 of first section 25 of female mating flange 26. Bellows seal 36 may minimize, or, typically, eliminate the leakage of air through joint 18.

Second section 27 of female mating flange 26 may have a channel 41 formed in a portion thereof. In one embodiment of the present invention, as shown in FIG. 2, channel 41 may be formed in an outer, distal portion of female mating flange 26. A locking ring 38 may fit into channel 41 to help hold joint 18 together by preventing rotation of threaded portion 49 relative to threads 31, thereby further minimizing leakage of air through joint 18.

Low profile tension style flexible joint 18 of the present invention may permit duct assembly mismatch between duct 10 and port 24 and unrestrained thermal growth of duct 10 while supporting the axial loads that exist within duct 10 when duct 10 is pressurized. The needed flexibility in joint 18 may be seen in the various locations that allow movement of joint 18. For example, space S2 may allow for axial flexing and distance variations of joint 18, and space S3 may allow for radial mismatch variations. These parameters may permit minor assembly mismatch, thereby requiring less precision in the manufacture of pneumatic ducting, such as duct 10. Moreover, low profile tension style flexible joint 18 of the present invention may also permit rotation of duct 18 relative to female mating flange 26 and bellows seal 36, thereby allowing dimensional flexibility in this direction also.

Low profile tension style flexible joint 18 may also include a protuberance 47 located on a distal end, relative to pneumatic port 24, of female mating flange 26. A radial face 50 may be used to axially position annular seat collar 32 when annular seat collar 32 is threadably attached to pneumatic port 24. When annular seat collar 32 is positioned by radial face 50 making contact with protuberance 47, the working cavity length for seal 36 is properly maintained.

Figure 4:
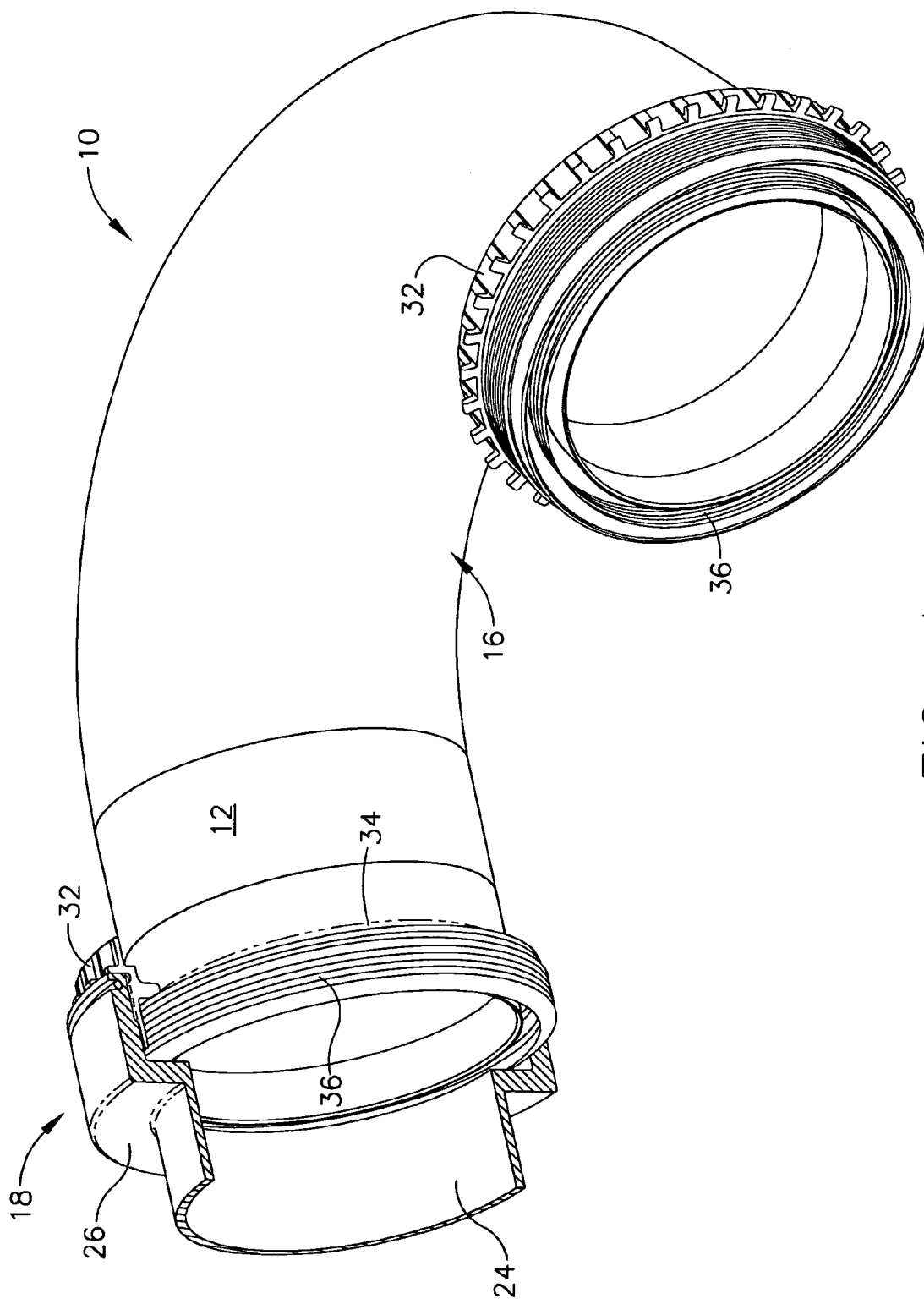
FIG. 4 is a partially cut-away perspective view of pneumatic duct having a low profile tension style flexible joint according to an embodiment of the present invention.

Referring to FIG. 4, there is shown a partially cut-away perspective view of pneumatic duct 10 having low profile tension style flexible joint 18 according to an embodiment of the present invention. Female mating flange 26, which may be attached to pneumatic port 24, is shown partially cut away at first end 12 for clarity. Annular seat collar 32 is also shown partially cut away at first end 12. Bellows seal 36 is shown fitted into position around annular flange 34.

Figure 5:
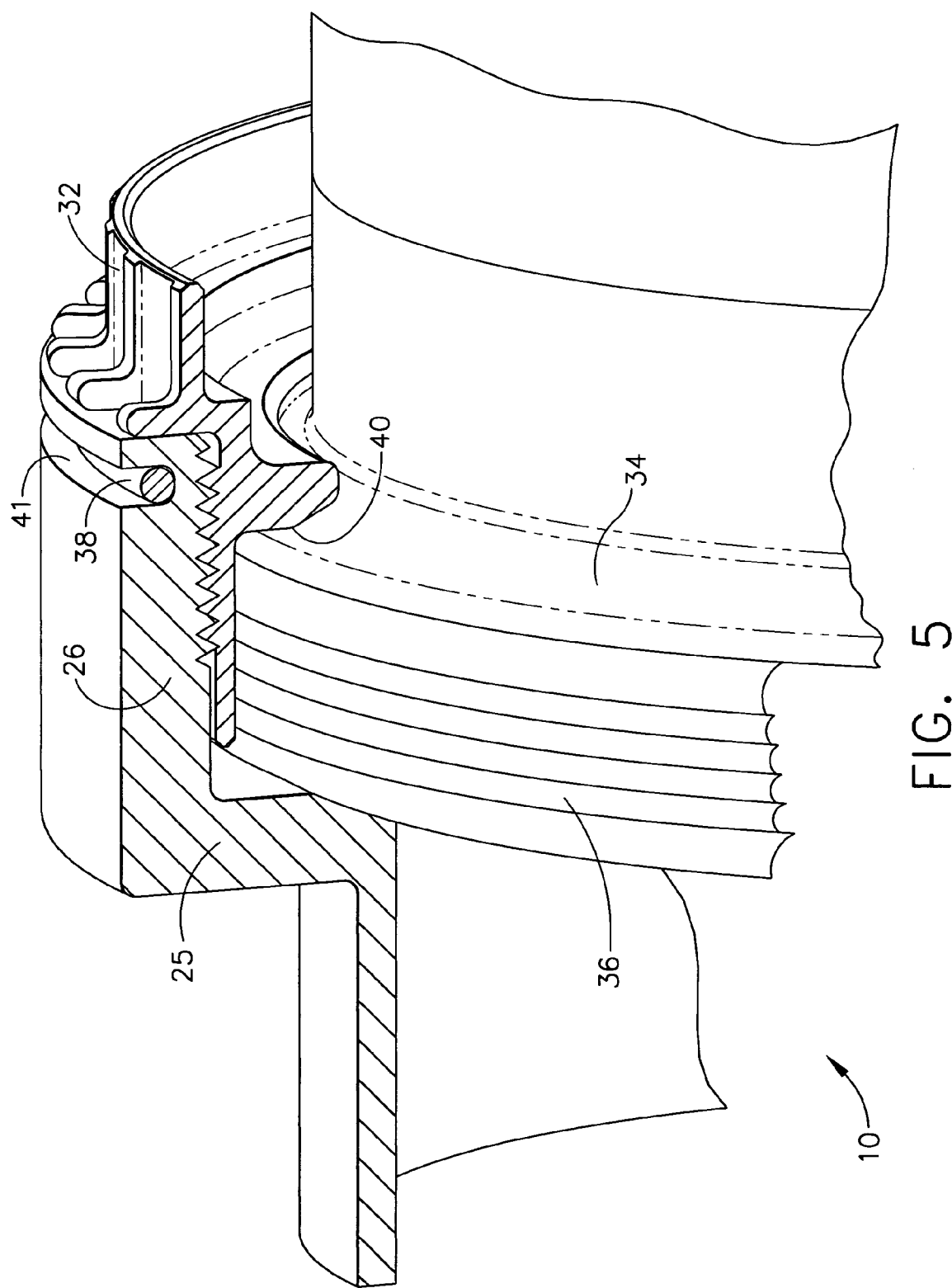
FIG. 5 is a close-up partial cross-sectional view of a portion of a low profile tension style flexible joint according to an embodiment of the present invention.

Referring now to FIG. 5, there is shown a close-up partial cross-sectional view of low profile tension style flexible joint 18 according to an embodiment of the present invention. Joint 18, in FIG. 4, is assembled with annular seat collar 32 threaded into place over annular flange 34 and female mating flange 26. Locking ring 38 is also shown in position within channel 41.

Figure 6:
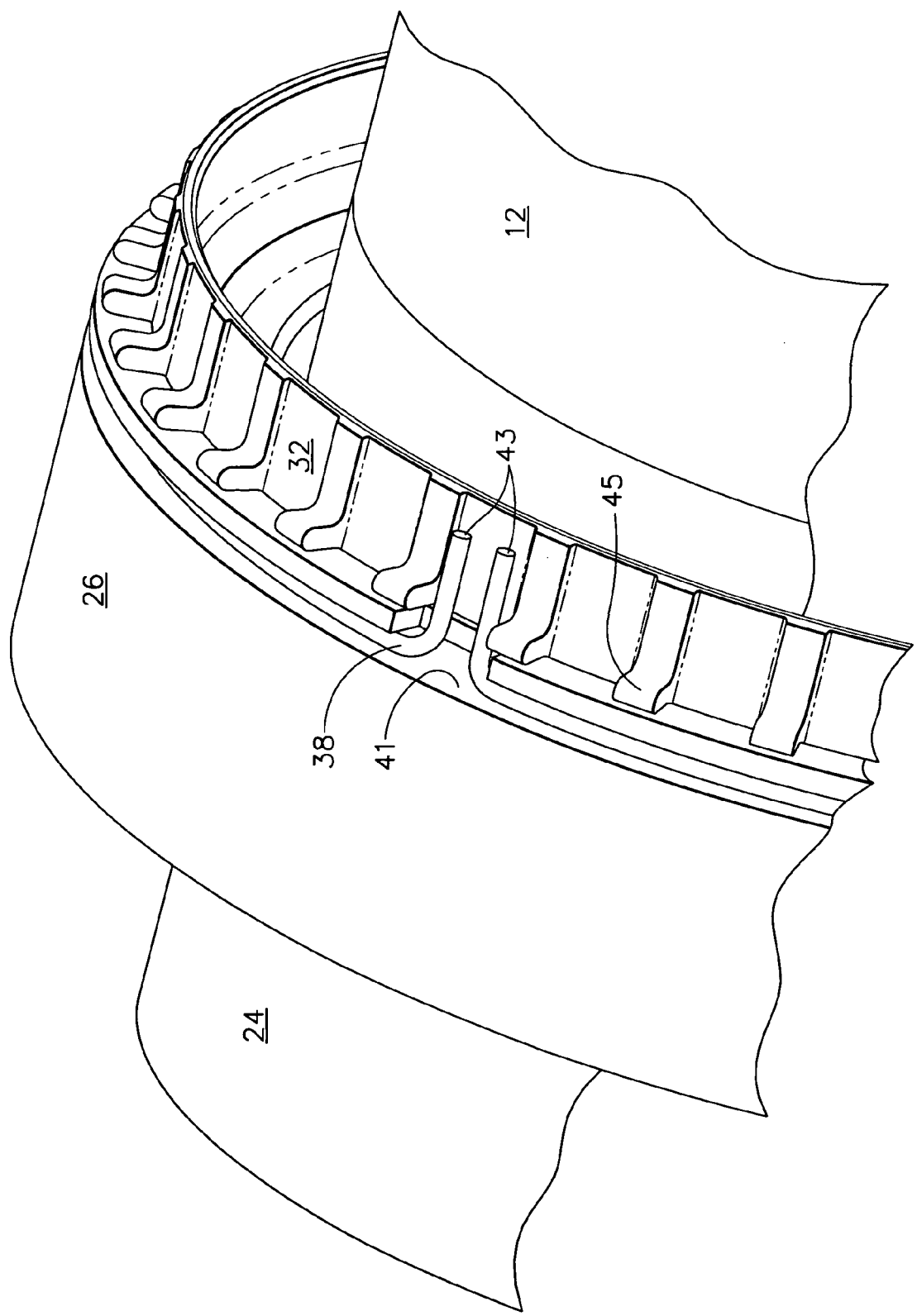
FIG. 6 is a perspective view of a low profile tension style flexible joint according to an embodiment of the present invention.

Referring to FIG. 6, there is shown a perspective view of a portion of an assembled low profile tension style flexible joint 18 according to an embodiment of the present invention. Locking ring 38, positioned in channel 41, may prevent rotation of annular seat collar 32. In one embodiment of the present invention, annular seat collar 32 may have a plurality of tabs 45 spaced on its external annular surface. Locking ring 38 may have end portions 43 which may be bent to extend out of channel 41, toward annular seat collar 32 (See FIG. 1). End portions 43 may prevent rotation of annular seat collar 32 by engaging tabs 45. End portions 43 may also aid in disassembly of joint 18 by providing an access point to grip locking ring 38 and remove locking ring 38 from channel 41.

As can be appreciated from the Example below, referring back to FIG. 3, low profile tension style flexible joint 18 of the present invention may have a length L of less than about 2.5 inches, more often less than about 2 inches, and even more often, less than about 1.5 inches. Further, low profile tension style flexible joint 18 of the present invention typically may have a diameter D of less than about 1.1 inches greater than the diameter of the pneumatic duct DD (see FIG. 2), and more typically, about 1 inch greater than the diameter of the pneumatic duct.

EXAMPLE

In one embodiment of the present invention, duct 10 may have a 3 inch outside diameter. In this embodiment, low profile tension style flexible joint 18 may be designed with a length L of only 1.020 inches and an outside diameter of 4.0 inches. Such a design permits packaging pneumatic duct 10 in a small installation envelope. Further, the design of the present invention, being reduced in size as compared with conventional designs, reduces the engine weight without compromising engine performance.

As a comparison, a conventional ball joint used in the same 3 inch outside diameter duct would require a joint length of 2.970 inches and an outside diameter of 4.150 inches. Thus, the low profile tension style flexible joint 18 of the present invention may more easily meet weight and cost goals that other conventional tension style flexible joints could not match.

While the above example has been described using a 3 inch outside diameter duct, the low profile tension style flexible joint of the present invention may be scaled for larger or smaller duct diameters. For example, the joint of the present invention may be applied to ducts having a typical outside diameter from about 2 to at least about 6 inches. Accordingly, as shown in the above example and comparative example, a similar reduction in size and weight may also be obtained with ducts of varying size.

It should be understood, of course, that the foregoing relates to exemplary embodiments of the invention and that modifications may be made without departing from the spirit and scope of the invention as set forth in the following claims.

We claim:

1. A joint for connecting a duct to a port comprising:
    an annular flange, having a sealing flange disposed radially outward therefrom, the annular flange fixedly attached to the duct;
    a female mating flange, having female threads disposed internally thereon, the female mating flange fixedly attached to the port;
    an annular seat collar having male threads disposed externally thereon, wherein the male threads are threadably attachable to the female threads and the annular seat collar having a surface contacting the sealing flange when the joint is assembled;
    a plurality of tabs spaced around an outer annular surface of the annular seat collar including channels formed therebetween; and
    a locking ring disposed over at least a portion of a circumference of the female mating flange, the locking ring including end portions that are bent outward from the tab channels, thereby preventing rotational motion of the annular seat collar when the joint is assembled.

2. The joint according to claim 1, further comprising a bellows seal sealingly positioned between the sealing flange and the female mating flange.

3. The joint according to claim 1 wherein the locking ring is disposed in a channel in the female mating portion.

4. The joint according to claim 1, wherein the joint has a length of less than about 2.5 inches, and a diameter of less than about 1.1 inches greater than the diameter of the duct.

5. The joint according to claim 1, wherein the joint has a length of less than about 1.5 inches, and a diameter of about 1.0 inch greater than the diameter of the duct.

6. The joint according to claim 1, further comprising:
a protuberance on a distal end, relative to the port; of the female mating flange; and
a radial face axially positioning the annular seat collar to contact the protuberance when the annular seat collar is threadably attached the port, thereby maintaining the working cavity length for the joint.

7. The joint according to claim 1, further comprising a grip integrally formed with the annular seal collar, the grip allowing for a user to threadably mate the annular seat collar with the female mating flange, thereby assembling the joint.

8. The joint according to claim 1, wherein the duct is attached to the annular flange with a weld.

9. The joint according to claim 1, wherein the port is attached to the female mating flange by either a weld or by forming the port integrally with the female mating flange.

10. A low profile tension style flexible joint comprising:
an annular flange, having a sealing flange disposed radially outward therefrom, the annular flange fixedly attached to the duct;
a female mating flange, having female threads disposed internally thereon, the female mating flange fixedly attached to the port;
an annular seat collar having male threads disposed externally thereon;
a bellows seal sealingly positioned between the sealing flange and the female mating flange;
a locking ring disposed over at least a portion of a circumference of the female mating flange and including end portions; and
a plurality of tabs spaced around an outer annular surface of the annular seat collar including channels formed therebetween;
wherein
the male threads threadably attach the female threads;
the annular seat collar has a spherical portion contacting the sealing flange when the joint is assembled; and
the locking ring includes end portions bent outward from the tab channels, thereby preventing rotational motion of the annular seat collar when the joint is assembled.

11. The joint according to claim 10, wherein the locking ring is disposed in a channel in the female mating portion.

12. The joint according to claim 10, wherein the joint has a length of less than about 1.5 inches and a diameter of about 1.0 inch greater than the diameter of the duct.

13. The joint according to claim 10, further comprising:
a protuberance on a distal end, relative to the port, of the female mating flange; and
a radial face axially positioning the annular seat collar to contact the protuberance when the annular seat collar is threadably attached the port, thereby maintaining the working cavity length for the joint.

14. The joint according to claim 10, further comprising a grip integrally formed with the annular seat collar, the grip allowing a user to threadably mate the annular seat collar with the female mating flange, thereby forming the joint.

15. The joint according to claim 10, wherein:
the duct is attached to the annular flange with a weld; and
the port is attached to the female mating flange by a weld or by forming the port integrally with the female mating flange.

16. A low profile tension style flexible joint for use in ducting compressor air to a turbomachine combustor, comprising:
an annular flange, having a sealing flange disposed radially outward therefrom, the annular flange fixedly attached to the duct;
a female mating flange, having female threads disposed internally thereon, the female mating flange fixedly attached to the port;
an annular seat collar having male threads disposed externally thereon;
a bellows seal sealingly positioned between the sealing flange and the female mating flange;
a protuberance on a distal end, relative to the port, of the female mating flange;
a radial face axially positioning the annular seat collar to contact the protuberance when the annular seat collar is threadably attached the port, thereby maintaining the working cavity length for the joint;
a locking ring disposed in a channel over at least a portion of a circumference of the female mating flange, the looking ring including end portions; and
a plurality of tabs spaced around an outer annular surface of the annular seat collar including channels formed therebetween; wherein
the male threads threadably attach to the female threads;
the annular seat collar has a spherical portion contacting the sealing flange when the joint is assembled;
the joint has a length of less than about 1.5 inches and a diameter of about 1.0 inch greater than the diameter of the duct; and
the locking ring end portions are bent outward from the tab channels, thereby preventing rotational motion of the annular seat collar when the joint is assembled.

17. The joint according to claim 16, further comprising a grip integrally formed with the annular seat collar, the grip allowing a user to threadably mate the annular seat collar with the female mating flange, thereby assembling the joint.

18. The joint according to claim 16, wherein:
the duct is attached to the annular flange with a weld; and
the port is attached to the female mating flange by a weld or the female mating flange is integral with the port.

19. A method for joining a duct and a port comprising:
attaching an annular flange to the duct, the annular flange having a sealing flange disposed radially outward therefrom;
providing a female mating flange attached to the port, the female mating flange having threads disposed internally thereon;
providing a plurality of tabs on the outer circumferential surface of the annular seat collar, the plurality of tabs including channels formed therebetween;
threadably engaging the female threads of the female mating flange with male threads of an annular seat collar having the male threads disposed externally thereon;
threading the male threads with the female threads to a point to cause contact between a portion of the sealing flange and the annular seat collar;
disposing a locking ring over at least a portion of a circumference of the female mating flange;
bending end portions of the locking ring from the channel over the outer circumferential surface of the annular seat collar; and
engaging the end portions with the plurality of tabs thereby preventing rotational motion of the annular seal collar when the joint is assembled.

20. The method according to claim 19, further comprising positioning a bellows seal between a sealing surface of the sealing flange and a sealing surface of the female mating flange.

21. The method according to claim 19, further comprising disposing the locking ring in a channel in an outer circumference of the female mating portion.

22. The method according to claim 19, wherein the joint has a length of less than about 1.5 inches and a diameter of not more than about 1.0 inch greater than the diameter of the duct.

23. A pneumatic duct having at least one joint on at least one end thereof for attaching the duct to a port, the joint comprising:

an annular flange having a sealing flange disposed radially outward therefrom, the annular flange attached to the duct;

a female mating flange having female threads disposed internally thereon, the female mating flange attached to the port;

an annular seat collar having male threads disposed externally thereon;

a bellows seal positioned between the sealing flange and the female mating flange;

a locking ring disposed in a channel over at least a portion of a circumference of the female mating flange and including end portions; and a plurality of tabs spaced around an outer annular surface of the annular seat collar including channels therebetween; wherein the male threads threadably attach to the female threads;

the annular seat collar having a spherical portion contacting the sealing flange when the joint is assembled; and the locking ring end portions are bent outward from the tab channels, thereby preventing rotational motion of the annular seat collar when the joint is assembled.

24. The pneumatic duct according to claim 23, wherein the joint has a length of less than about 1.5 inches and a diameter of not more than about 1.0 inch greater than the diameter of the duct.

* * * * *